United States Patent
Ting

(10) Patent No.: US 6,502,794 B1
(45) Date of Patent: Jan. 7, 2003

(54) HANGER DEVICE WITH SUCTION CUP

(76) Inventor: Tzu-Kuang Ting, No. 108, Hu-An Rd., Ching-Shui Chen, Taichung Hsien (TW)

( * ) Notice: Subject to any disclaimer, the term of this patent is extended or adjusted under 35 U.S.C. 154(b) by 0 days.

(21) Appl. No.: 09/884,488

(22) Filed: Jun. 18, 2001

(51) Int. Cl.⁷ .............................................. F16B 47/00
(52) U.S. Cl. ................... 248/206.2; 248/362; 248/363; 248/683; 248/205.5
(58) Field of Search .......................... 248/205.5, 206.2, 248/206.3, 683, 205.6, 205.8, 362, 363

(56) References Cited

U.S. PATENT DOCUMENTS

| | | | |
|---|---|---|---|
| 947,751 A | * | 1/1910 | Long et al. |
| 952,495 A | * | 3/1910 | Austin |
| 2,028,640 A | * | 1/1936 | Zaiger ........................ 248/206 |
| 2,194,997 A | * | 3/1940 | Butler ........................... 45/28 |
| 2,233,870 A | * | 3/1941 | Muter ........................ 248/206 |
| 4,133,575 A | * | 1/1979 | Mader ..................... 296/95 R |
| 4,842,912 A | * | 6/1989 | Hutter, III ................... 428/65 |
| 4,848,713 A | * | 7/1989 | Adams .................... 248/206.2 |
| 5,078,356 A | * | 1/1992 | Adams .................... 248/206.2 |
| 5,087,005 A | * | 2/1992 | Holoff et al. ............ 248/205.8 |
| 5,104,077 A | * | 4/1992 | Liu .......................... 248/205.8 |
| 5,402,974 A | * | 4/1995 | Adams .................... 248/205.5 |
| 5,592,244 A | * | 1/1997 | Vyhmeister ................. 351/158 |
| 6,180,115 B1 | * | 1/2001 | Conrard et al. ............. 424/400 |
| 6,193,197 B1 | * | 2/2001 | Lian ........................ 248/206.2 |

* cited by examiner

*Primary Examiner*—Anita King
*Assistant Examiner*—Steven Marsh
(74) *Attorney, Agent, or Firm*—Jenkens & Gilchrist, P.C.

(57) ABSTRACT

A hanger device includes a suction cup, a faceplate, and a rotary operating member. The suction cup includes a disc portion, an externally threaded post, and a peripheral flange. The externally threaded post extends rearwardly from a rear side of the disc portion. The faceplate is disposed to rest against the rear side of the disc portion, and has an intermediate part formed with a through-hole for allowing the externally threaded post to pass therethrough. The rotary operating member is formed with an internally threaded hole, and engages threadedly the externally threaded post so as to enable the rotary operating member to urge the faceplate toward the suction cup, thereby securing the suction cup on a surface.

3 Claims, 9 Drawing Sheets

US 6,502,794 B1

HANGER DEVICE WITH SUCTION CUP

BACKGROUND OF THE INVENTION

1. Field of the Invention

The invention relates to a hanger device, more particularly to a hanger device with a suction cup.

2. Description of the Related Art

In order to hang objects on a wall, hooks are mounted on the wall by driving nails into the latter. Because the hooks are fixed on the wall, the positions of the same cannot be readily adjusted according to the needs of users. Furthermore, the nails for fixing the hooks damage the wall.

SUMMARY OF THE INVENTION

Therefore, the main object of the present invention is to provide a hanger device with a suction cup to overcome the aforementioned drawbacks of the prior art.

Accordingly, a hanger device of the present invention comprises a suction cup, a faceplate, and a rotary operating member. The suction cup includes a disc portion, an externally threaded post, and a peripheral flange. The disc portion has a front side adapted to be placed against a surface, and a rear side opposite to the front side. The externally threaded post extends rearwardly from an intermediate area of the rear side of the disc portion. The peripheral flange extends rearwardly from a periphery of the disc portion, and has a radial inner side. The faceplate is disposed to rest against the rear side of the disc portion, and has a peripheral part and an intermediate part. The peripheral part extends radially and outwardly, and abuts against the radial inner side of the peripheral flange. The intermediate part is formed with a through-hole for allowing the externally threaded post to pass therethrough. The rotary operating member is formed with an internally threaded hole, and engages threadedly the externally threaded post so as to enable the rotary operating member to urge the intermediate part of the faceplate toward the suction cup, thereby securing the suction cup on the surface.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
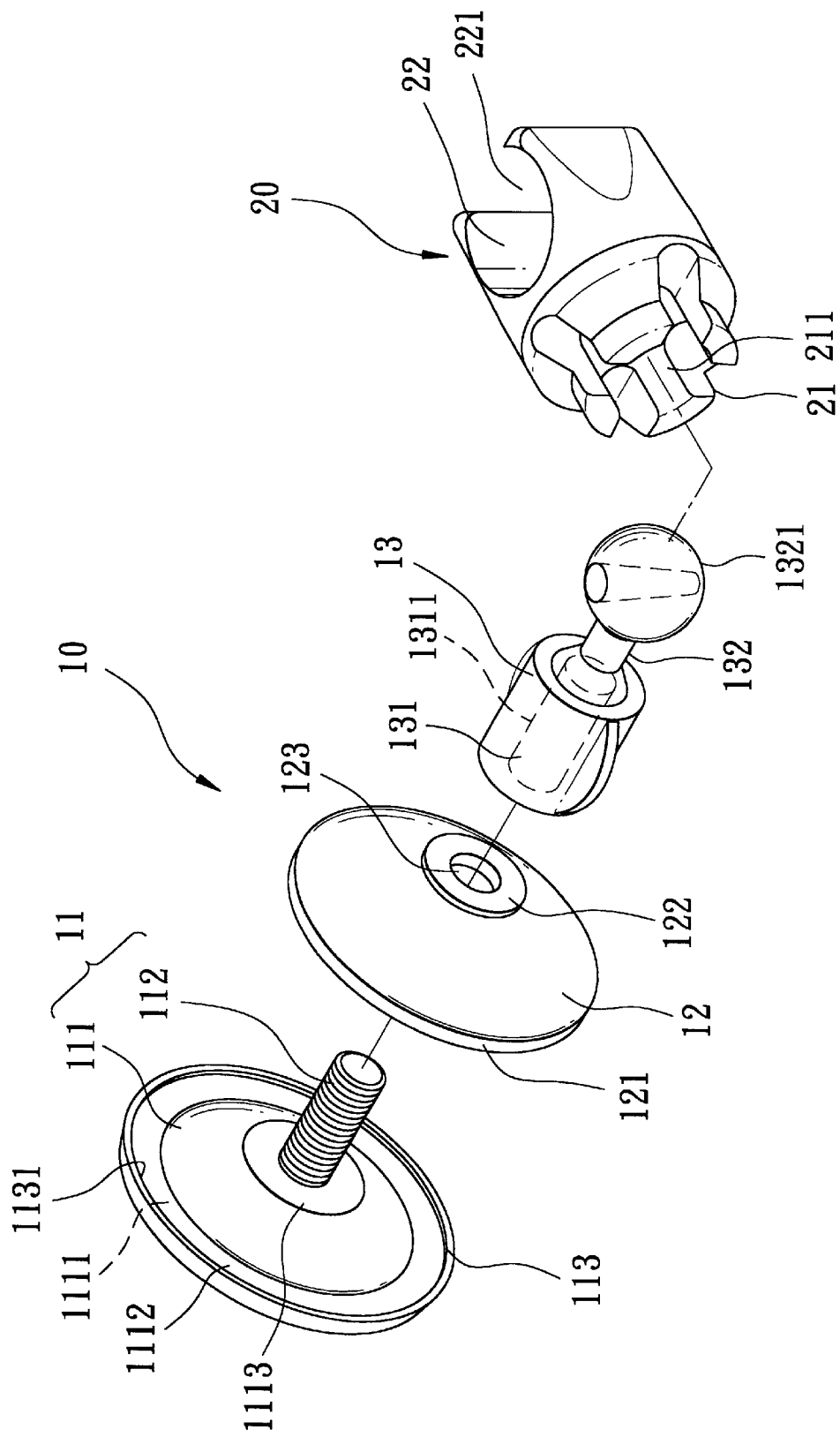
FIG. 1 is an exploded perspective view of the first preferred embodiment of a hanger device according to the present invention.

Before the present invention is described in greater detail, it should be noted that like elements are denoted by the same reference numerals throughout the disclosure.

Referring to FIG. 1, the first preferred embodiment of a hanger device 10 according to the present invention is shown to comprise a suction cup 11, a faceplate 12, a rotary operating member 13, and an accessory member 20. The suction cup 11 includes a disc portion 111, an externally threaded post 112, and a peripheral flange 113. The disc portion 111 has a front side 1111 adapted to be placed against a surface, and a rear side 1112 opposite to the front side 1111. The externally threaded post 112 extends rearwardly from an intermediate area 1113 of the rear side 1112 of the disc portion 111. The peripheral flange 113 extends rearwardly from a periphery of the disc portion 111, and has a radial inner side 1131. The faceplate 12 is disposed to rest against the rear side 1112 of the disc portion 111, has a peripheral part. 121 and an intermediate part 122. The peripheral part 121 extends radially and outwardly, and abuts against the radial inner side 1131 of the peripheral flange 113. The intermediate part 122 is formed with a through-hole 123 for allowing the externally threaded post 112 to pass therethrough. The rotary operating member 13 has a rear shaft portion 131 and a front coupling portion 132. The rear shaft portion 131 is formed with an internally threaded hole 1311, and engages threadedly the externally threaded post 112. The front coupling portion 132 extends from the rear shaft portion 131, and is formed with a ball connector 1321. The accessory member 20 is mounted removably on the front coupling portion 132, and has a rear part 21 and a front part 22. The rear part 21 is formed with a ball socket 211, and engages rotatably and removably the ball connector 1321. The front part 22 is formed with a clamp 221 that is configured for clamping a showerhead.

Figure 2:
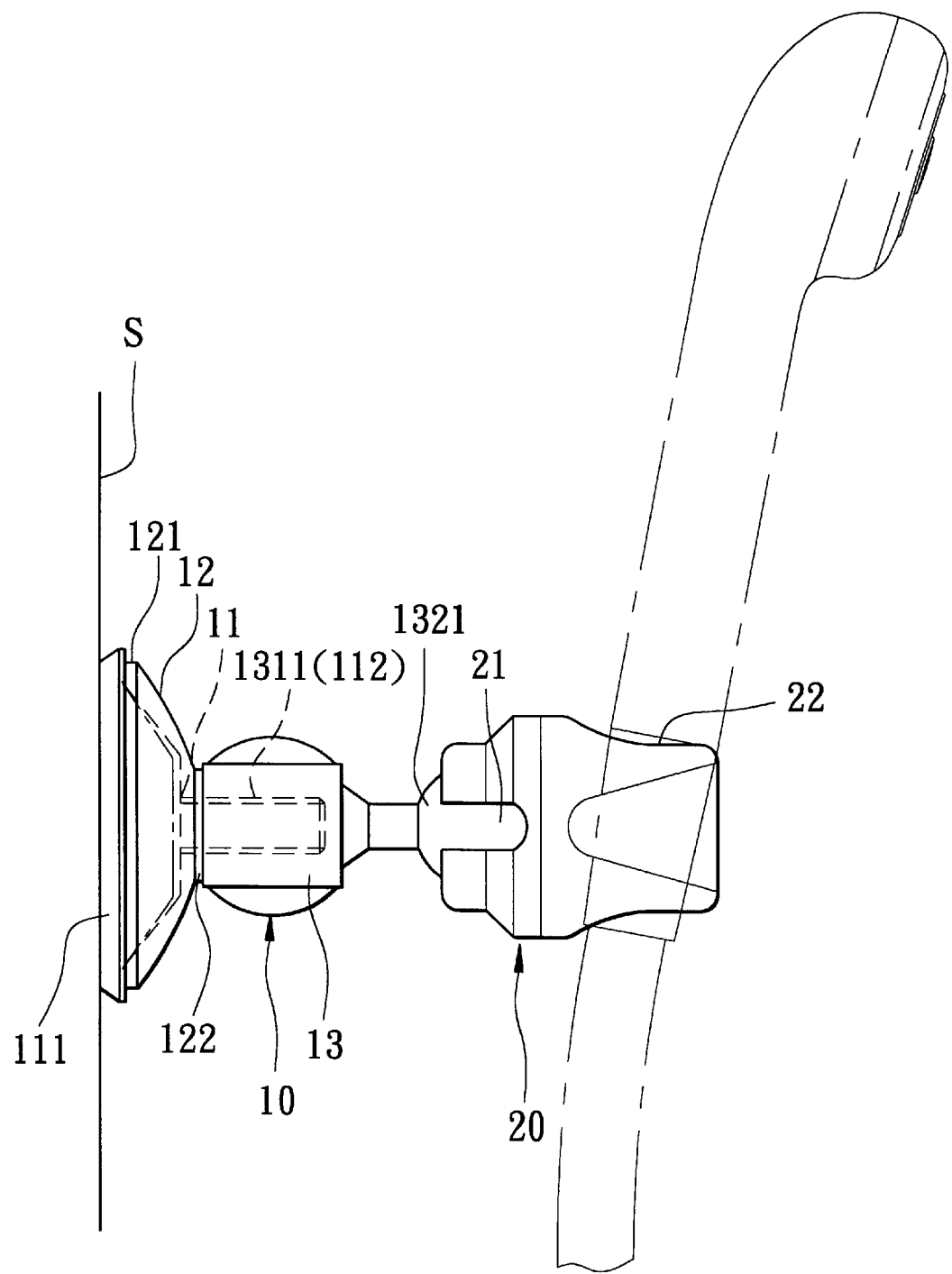
FIG. 2 is a schematic view illustrating the first preferred embodiment in a state of use.

In use, the faceplate 12 is disposed on the rear side 1112 of the disc portion 111, and the latter is placed against a desired surface (S). The rotary operating member 13 is threadedly connected to the post 112 for urging the faceplate 12 toward the suction cup 11, thereby securing the latter on the surface (S). At the same time, the disc portion 111 of the suction cup 11 is pulled by the externally threaded post 112 toward the faceplate 12, thereby resulting in a slight increase in the volume of a vacuum space defined between the suction cup 11 and the surface (S) to result in an even smaller air pressure in the vacuum space. As such, the hanger device 10 can securely adhere on the surface (S). Thereafter, the accessory member 20 is engaged removably and rotatably to the rotary operating member 13. A showerhead can now be hung on the hanger device 10, as best shown in FIG. 2. To remove the hanger device 10 from the surface (S), the rotary operating member 13 is simply loosened from the post 112.

Figure 3:
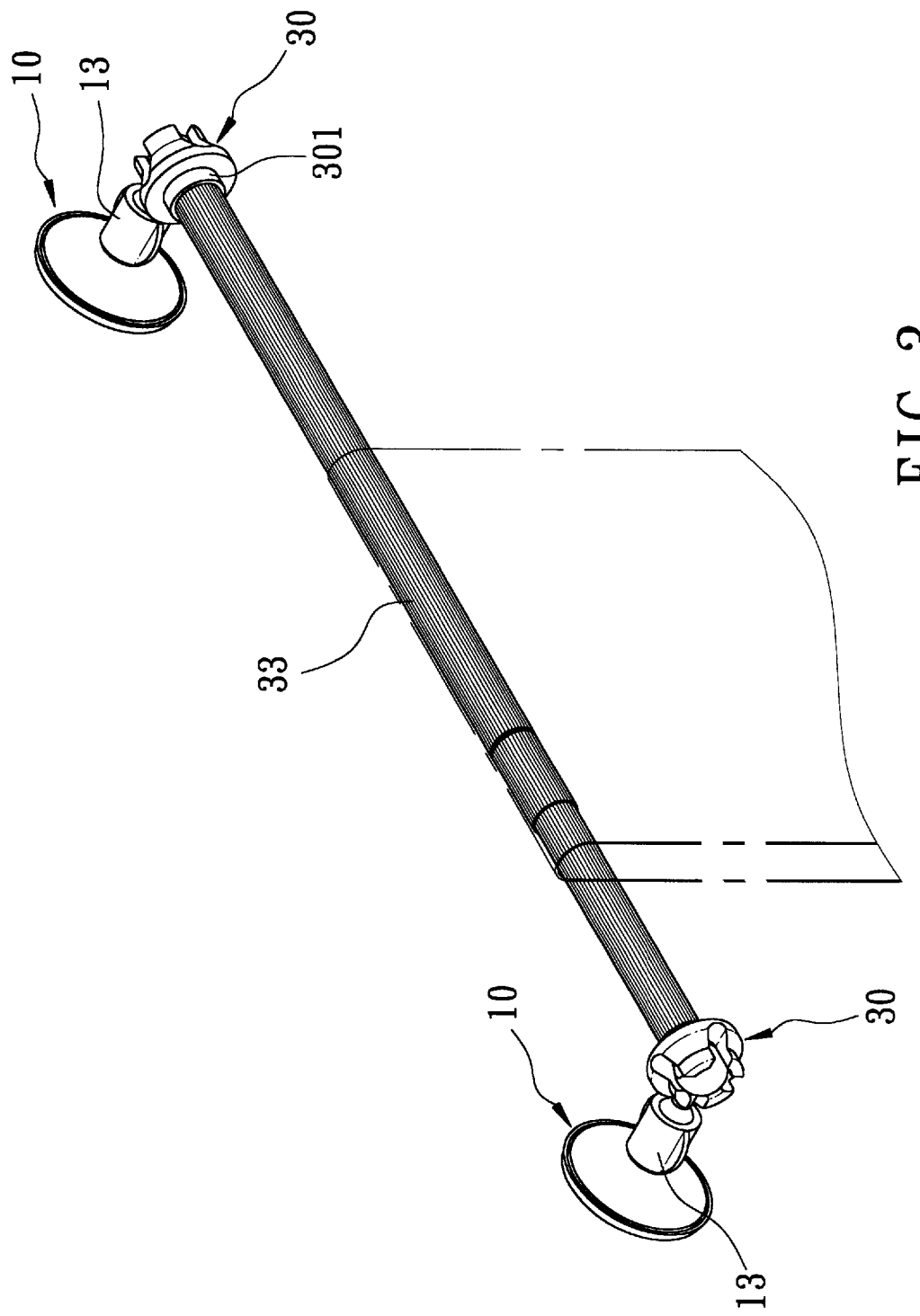
FIGS. 3 and 4 respectively illustrate two uses of the second preferred embodiment of a hanger device according to the present invention.

The second preferred embodiment of the hanger device 10 according to the present invention is illustrated in FIG. 3. Unlike the first preferred embodiment, the clamp 301 of the accessory member 30 is adapted for clamping one end of a telescopic bar 33. In use, two sets of the hanger devices 10 are adhered on a wall surface with a predetermined distance therebetween in order to clamp opposite ends of the bar 33. A towel can thus be hung on the bar 33.

Figure 4:
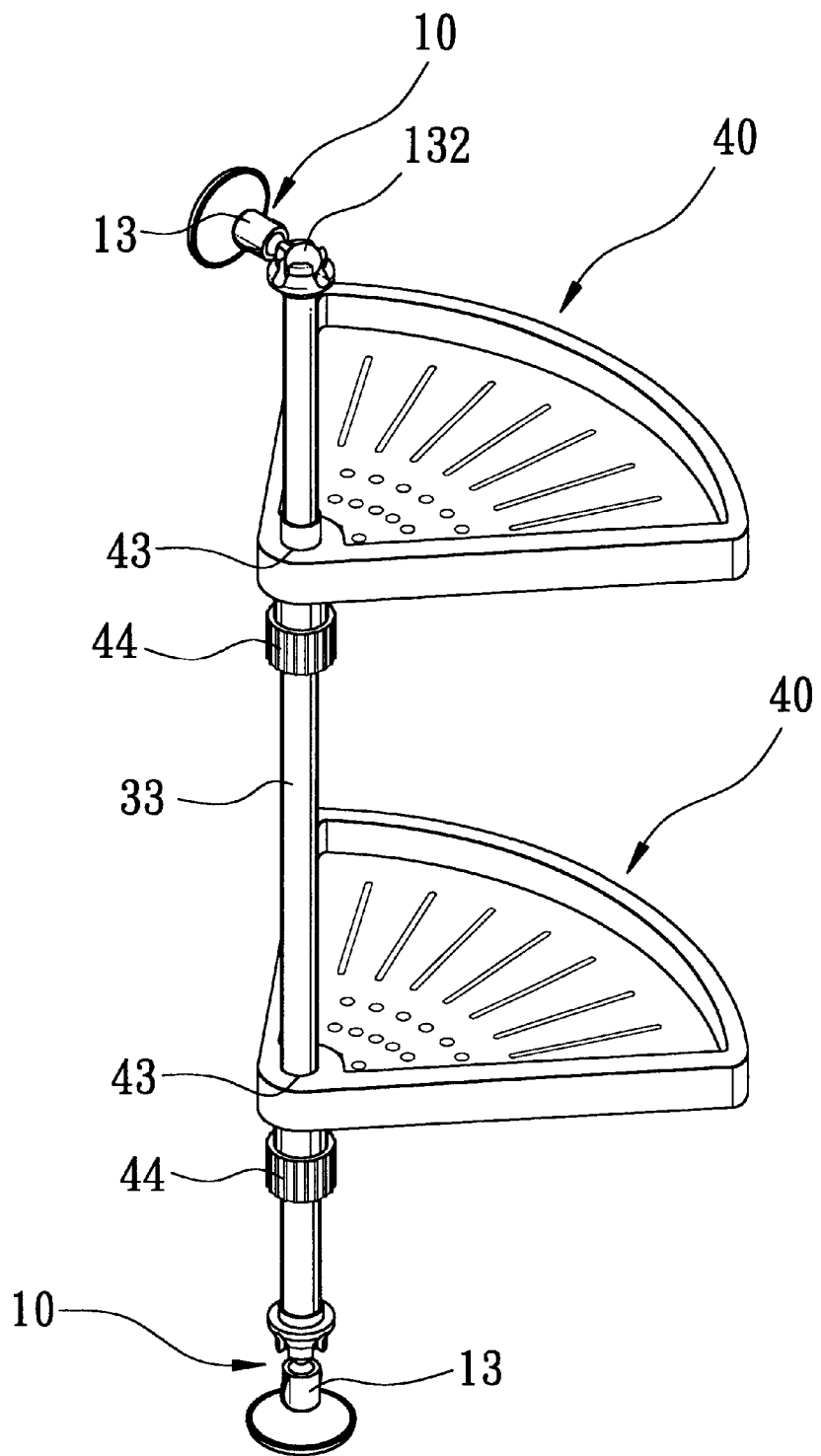

Another use of the second preferred embodiment is shown in FIG. 4, wherein the hanger devices 10 are spaced apart from each other in a vertical direction. At least two sundry trays 40 are retained on the telescopic bar 33. Each of the trays 40 is formed with a through-hole 43 for extension of the bar 33 therethrough, and is retained securely on the bar 33 by a conventional locking device 44. After the sundry trays 40 are secured on the bar 33, the latter can be brought to engage the hanger devices 10 to form a sundry rack.

Figure 5:
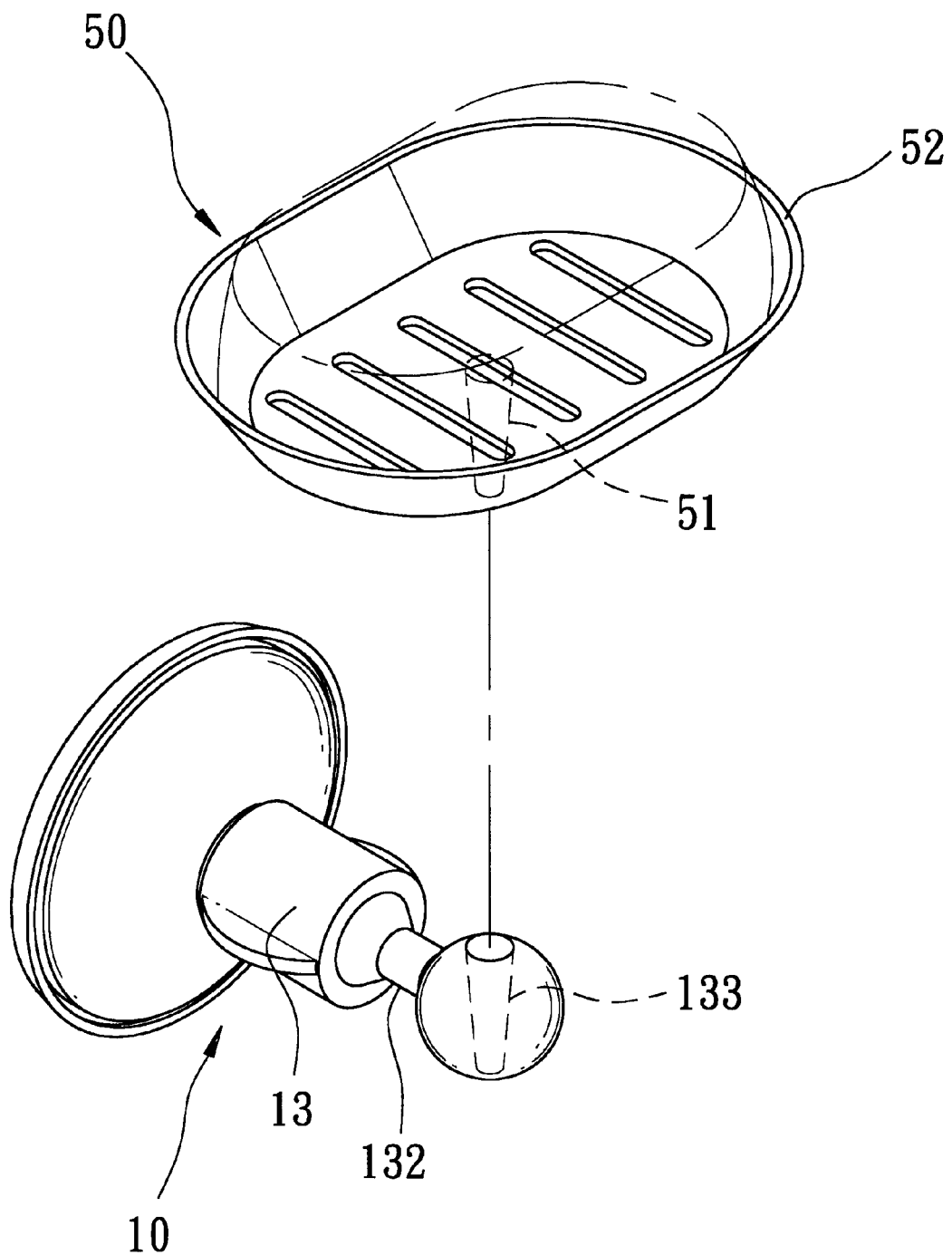
FIG. 5 is a perspective view of the third preferred embodiment of a hanger device according to the present invention.

Referring to FIG. 5, the third preferred embodiment of the hanger device 10 according to the present invention is shown to be substantially similar to the first preferred embodiment. In this embodiment, the front coupling portion 132 of the rotary operating member 13 is formed with a tapered pinhole 133 that is transverse to the axis of the internally threaded hole (not visible) and the accessory member 50 is formed with a soap bar receiving tray 52 and an insert pin 51 that extends from the receiving tray 52. The insert pin 51 is inserted into the pin hole 133 of the rotary operating member 13, thereby securing the accessory member 50 on the hanger device 10. A soap bar can be placed on the receiving tray 52.

Figure 6:
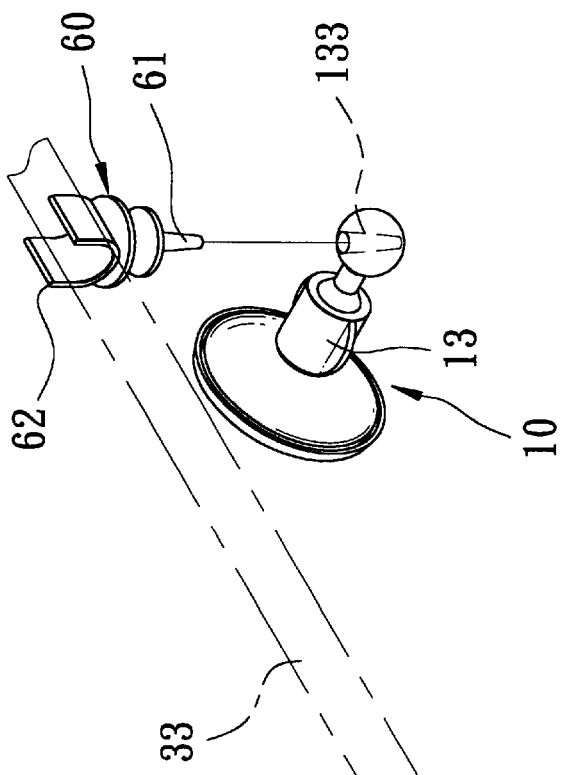
FIG. 6 is a perspective view of the fourth preferred embodiment of a hanger device according to the present invention.
Figure 6:
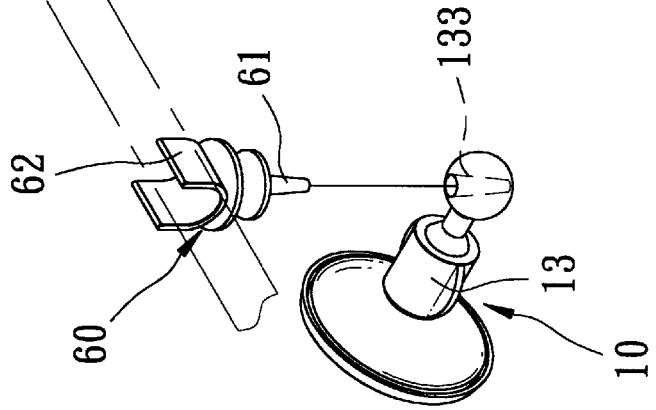

The fourth preferred embodiment of the hanger device 10 according to the present invention is shown in FIG. 6 to be substantially similar to the third preferred embodiment. However, in this embodiment, the accessory member 60 is formed with a clamp 62 that opens upwardly, and an insert pin 61 that extends downwardly from the clamp 62. The insert pin 61 is inserted into the pin hole 133 of the rotary operating member 13. In use, two sets of the hanger devices 10 are adhered on a wall surface with a predetermined distance therebetween so as to be adapted to clamp a bar 33 for drying clothes.

Figure 7:
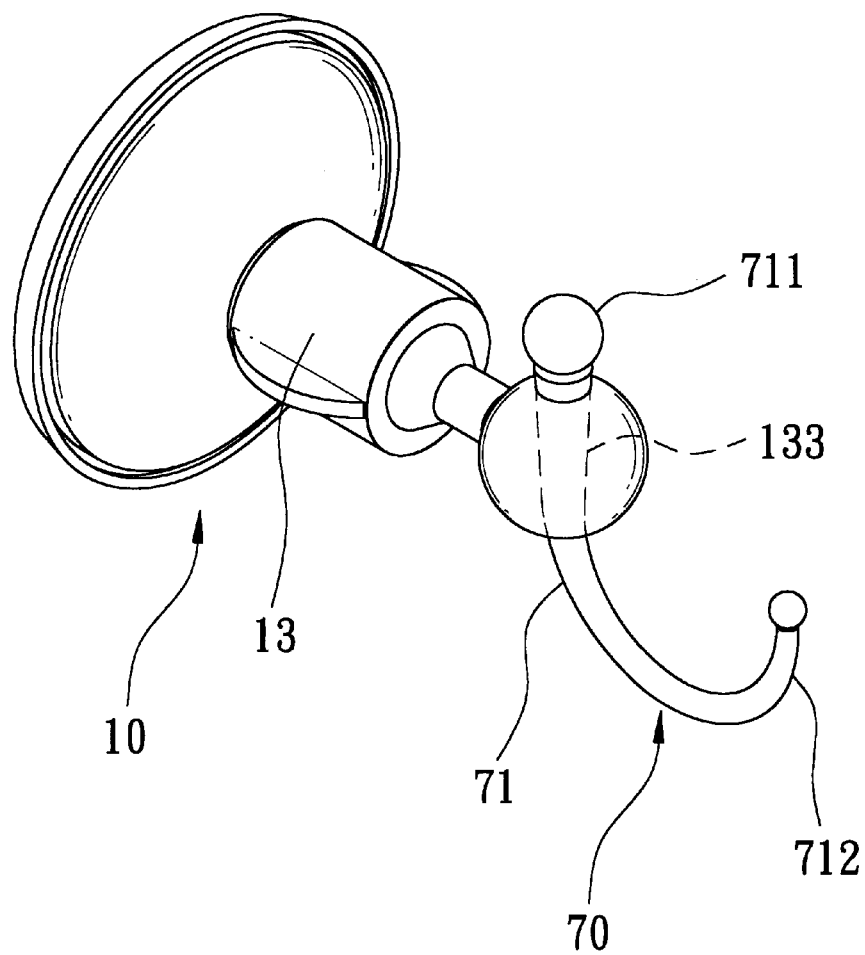
FIG. 7 is a perspective view of the fifth preferred embodiment of a hanger device according to the present invention.
Figure 8:
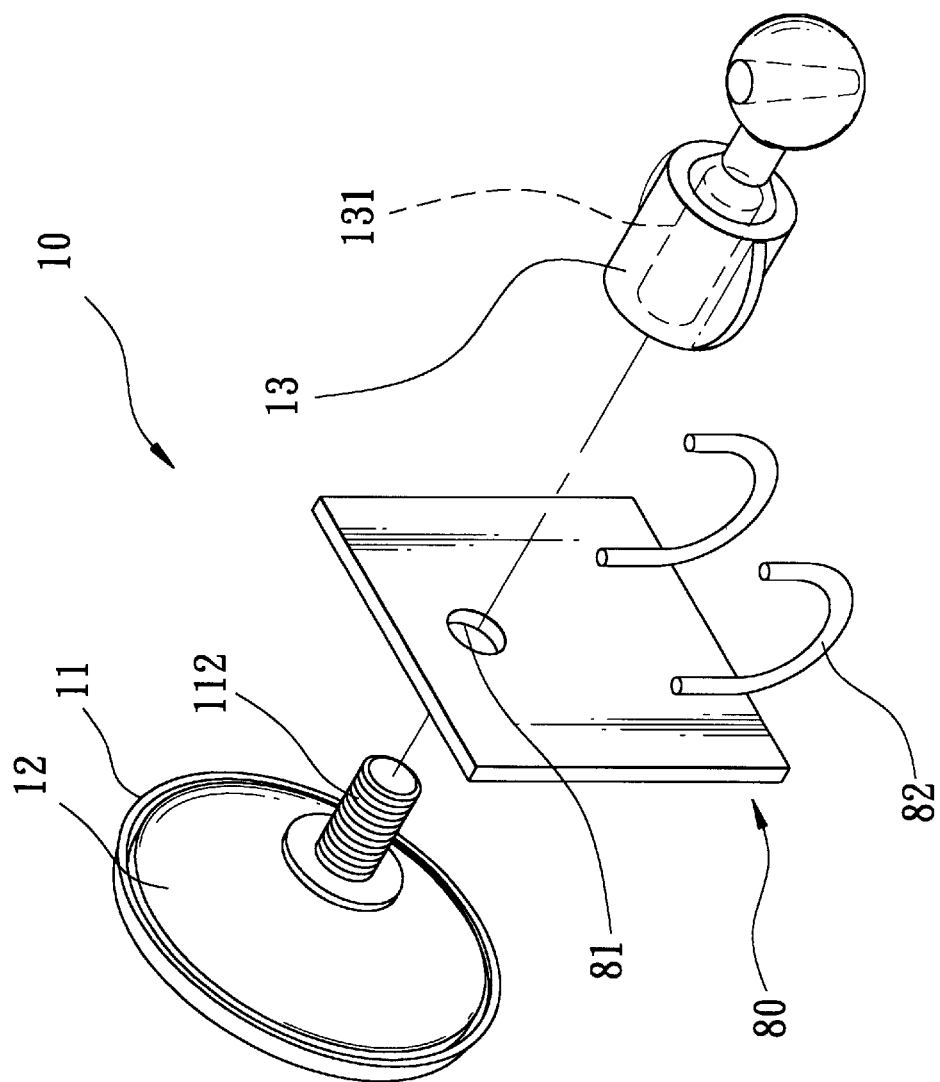
FIG. 8 is a an exploded perspective view of the sixth preferred embodiment of a hanger device according to the present invention.

Referring to FIG. 7, the fifth preferred embodiment of the hanger device 10 according to the present invention is shown to be substantially similar to the third preferred embodiment. The accessory member 70, in this embodiment, is formed as a hook 71 that is retained removably in the pinhole 133. The hook 71 has a decreasing diameter in a direction from an upper retaining portion 711 to a lower hook portion 712 thereof. The upper retaining portion 711 is retained in the pin hole 133, and the lower hook portion 712 is extended through the pin hole 133 of the rotary operating member 13, thereby permitting the hanging of a robe thereon.

The sixth-preferred embodiment of the hanger device 10 according to the present invention is shown to be substantially similar to the first preferred embodiment. In this embodiment, the hanger device 10 further comprises a hanger board 80 disposed between the faceplate 12 and the rotary operating member 13. The hanger board 80 is formed with a post hole 81 to permit the externally threaded post 112 to pass therethrough, and has at least two hook units 82 mounted on a lower part thereof. After the hanger board 80 is hung on the externally threaded post 112, the rotary operating member 13 is threadedly connected to the post 112, thereby urging both the hanger board 80 and the faceplate 12 toward the suction cup 11 so as to secure the suction cup 11 on a surface. Clothes can be hung on the hooks 82 of the hanger board 80.

Figure 9:
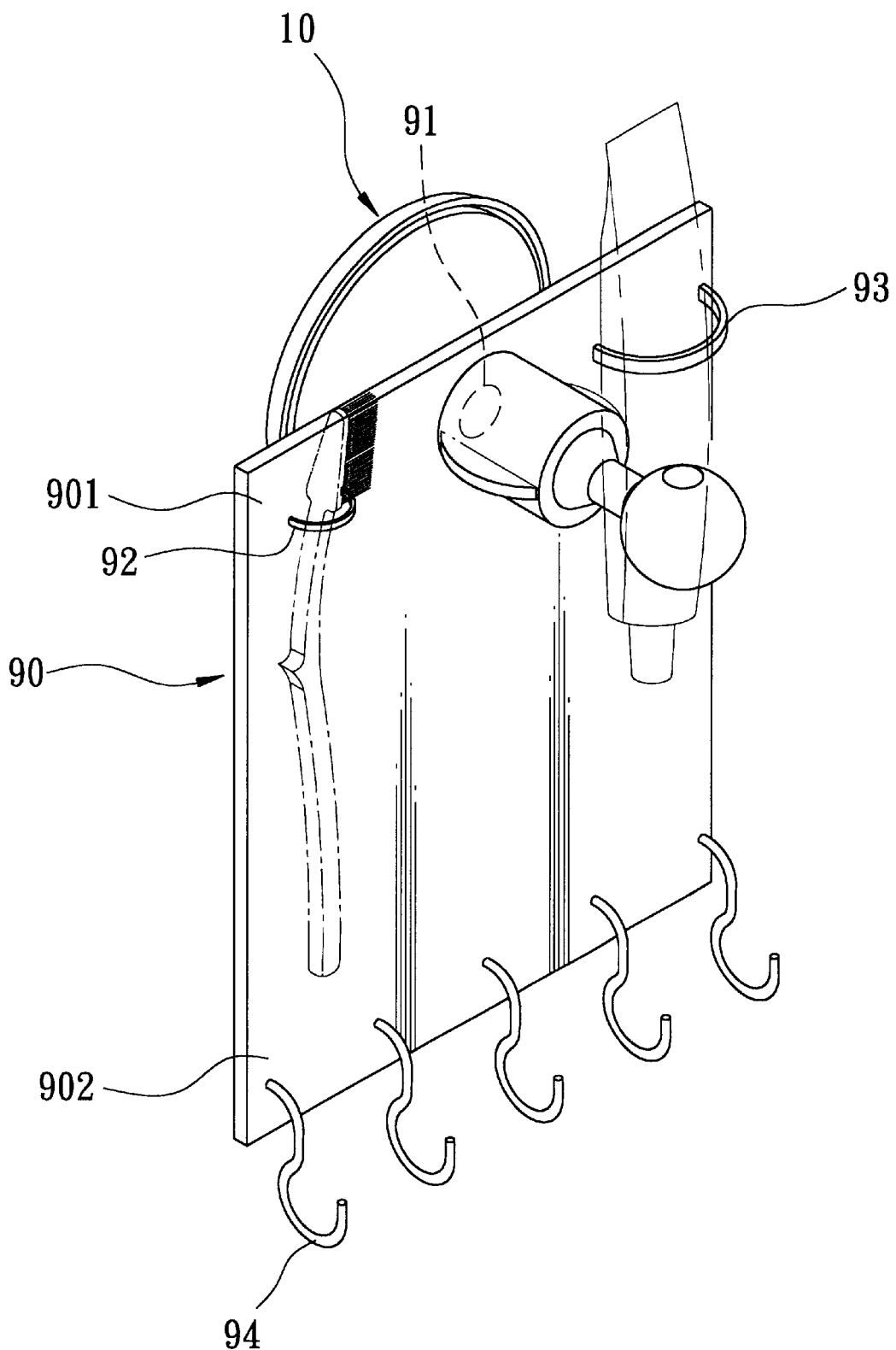
FIG. 9 a perspective view illustrating a modified accessory member of the sixth preferred embodiment.

With reference to FIG. 9, the hanger board 90 can be formed with a bigger dimension. The upper end 901 of the hanger board 90 has a left sleeve ring 92, a right sleeve ring 93 bigger than the left sleeve ring 92, and a post hole 91 between the rings 92, 93. The lower end 902 of the hanger board 90 has a plurality of S-hooks 94 mounted thereon. In use, a toothbrush and a toothpaste can be retained by the left and right sleeve rings 92, 93 respectively. The S-hooks 94 can be used for hanging sundries.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A hanger device comprising:

a suction cup including a disc portion with a front side adapted to be placed against a surface, and a rear side opposite to said front side, an externally threaded post extending rearwardly from an intermediate area of said rear side of said disc portion, and a peripheral flange extending rearwardly from a periphery of said disc portion and having a radial inner side;

a faceplate disposed to rest against said rear side of said disc portion, said faceplate having a peripheral part that extends radially and outwardly and that abuts against said radial inner side of said peripheral flange, and an intermediate part that is formed with a through-hole for allowing said externally threaded post to pass therethrough;

a rotary operating member formed with an internally threaded hole for engaging threadedly said externally threaded post so as to enable said rotary operating member to urge said intermediate part of said faceplate toward said suction cup in order to secure said suction cup on the surface;

wherein said rotary operating member has a rear shaft portion formed with said internally threaded hole, and a front coupling portion extending from said rear shaft portion, said hanger device further comprising an accessory member mounted removably on said front coupling portion of said rotary operating member; and wherein said front coupling portion of said rotary operating member is formed with a ball connector, said accessory member having a rear part formed with a ball socket for engaging rotatably and removably said ball connector, and a front part formed with a clamp.

2. The hanger device of claim 1, wherein said clamp is adapted for clamping a showerhead.

3. The hanger device of claim 1, wherein said clamp is adapted for clamping one end of a bar.

* * * * *